US010710485B2

(12) United States Patent
Yilma et al.

(10) Patent No.: US 10,710,485 B2
(45) Date of Patent: Jul. 14, 2020

(54) VEHICLE HEAD RESTRAINT THAT CAN BE SEPARATED FROM A SEATBACK YET REMOTELY ACTUATED TO MOVE TO A FOLDED POSITION WHEN ATTACHED TO THE SEATBACK

(71) Applicant: Ford Global Technologies, LLC, Dearborn, MI (US)

(72) Inventors: Benjamin Yilma, Canton, MI (US); Syed Haider, Canton, MI (US); Chris Fredriksson, LaSalle (CA); Anton Crainic, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 67 days.

(21) Appl. No.: 16/142,412

(22) Filed: Sep. 26, 2018

(65) Prior Publication Data

US 2020/0094719 A1 Mar. 26, 2020

(51) Int. Cl.
*B60N 2/859* (2018.01)
*B60N 2/30* (2006.01)
*B60N 2/882* (2018.01)

(52) U.S. Cl.
CPC ........... *B60N 2/859* (2018.02); *B60N 2/3009* (2013.01); *B60N 2/882* (2018.02)

(58) Field of Classification Search
CPC ........ B60N 2/859; B60N 2/856; B60N 2/841; B60N 2/838; B60N 2/806; B60N 2/882; B60N 2/3009
USPC ....................................................... 297/408
See application file for complete search history.

(56) References Cited

U.S. PATENT DOCUMENTS

| 5,738,411 | A | * | 4/1998 | Sutton ................. | B60N 2/3013 297/378.12 |
| 6,129,421 | A | | 10/2000 | Gilson et al. | |
| 7,367,626 | B2 | * | 5/2008 | Lawall ............... | B60N 2/42781 297/410 |
| 8,157,320 | B2 | * | 4/2012 | Sayama ............... | B60N 2/3011 297/61 |
| 8,348,347 | B2 | | 1/2013 | Willard et al. | |
| 8,459,731 | B2 | * | 6/2013 | Runde .................. | B60N 2/856 297/61 |
| 8,851,574 | B2 | | 10/2014 | Yetukuri et al. | |

(Continued)

*Primary Examiner* — Mark R Wendell
(74) *Attorney, Agent, or Firm* — David Coppiellie; Price Heneveld LLP

(57) ABSTRACT

A seating assembly comprises: a head restraint that can be both separated from a seatback to a separated position, and remotely actuated via a user-accessible manipulable device located away from the head restraint to move the head restraint to a folded position when coupled to the seatback in an extending position. A cable of the seatback is not operably coupled with the head restraint when the user-accessible manipulable device is not manipulated but becomes operably coupled with the head restraint, when the user-accessible manipulable device is manipulated and the head restraint is in the extending position, to cause the head restraint to move from an upright position to the folded position. The cable of the seatback extends into a post receiver and operably couples with the head restraint within the post receiver when the head restraint is in the extending position and the user-accessible manipulable device is manipulated.

20 Claims, 13 Drawing Sheets

(56) References Cited

U.S. PATENT DOCUMENTS

| | | | |
|---|---|---|---|
| 8,979,203 B1 * | 3/2015 | Sutter, Jr. | B60N 2/847 297/408 |
| 2002/0079732 A1 * | 6/2002 | Saberan | B60N 2/818 297/408 |
| 2007/0132299 A1 * | 6/2007 | Fernandez De La Pradilla | B60N 2/856 297/408 |
| 2009/0071283 A1 | 3/2009 | Yetukuri et al. | |
| 2009/0322126 A1 * | 12/2009 | Nishiura | B60N 2/888 297/216.12 |
| 2013/0093218 A1 * | 4/2013 | Yetukuri | B60N 2/859 297/61 |
| 2013/0140866 A1 * | 6/2013 | Yetukuri | B60N 2/844 297/408 |

* cited by examiner

VEHICLE HEAD RESTRAINT THAT CAN BE SEPARATED FROM A SEATBACK YET REMOTELY ACTUATED TO MOVE TO A FOLDED POSITION WHEN ATTACHED TO THE SEATBACK

FIELD OF THE INVENTION

The present invention generally relates to a seating assembly for a vehicle, and more particularly, to the coupling of a head restraint of the seating assembly to a seatback of the seating assembly.

BACKGROUND OF THE INVENTION

A vehicle typically includes a seating assembly with a seatback and a head restraint cooperating with the seatback. Sometimes, the head restraint can be actuated to move from an upright position to a folded position. However, in such circumstances, the head restraint cannot be separated from the seatback, such as to allow for desired placement of a child safety seat on the seating assembly.

SUMMARY OF THE INVENTION

According to a first aspect of the present invention, a seating assembly for a vehicle comprises: a seatback; and a head restraint. The head restraint comprises: an extending position where the head restraint extends from the seatback; a separated position where the head restraint is separated from the seatback; an upright position, such that, when the head restraint is in the extending position, an occupant supporting surface of the head restraint is positioned to support a head of an occupant; and a folded position, such that, when the head restraint is in the extending position, the occupant supporting surface of the head restraint is positioned differently than when the head restraint is in the upright position.

Embodiments of the first aspect of the invention can include any one or a combination of the following features:
  the seatback including a cable extending through an interior of the seatback;
  the seatback including a user-accessible manipulable device that, when manipulated, moves the cable to cause a transition of the head restraint from the upright position to the folded position when the head restraint is in the extending position;
  the cable of the seatback is not operably coupled with the head restraint when the user-accessible manipulable device is not manipulated but becomes operably coupled with the head restraint, when the user-accessible manipulable device is manipulated and the head restraint is in the extending position, to cause the head restraint to move from the upright position to the folded position;
  the user-accessible manipulable device is a handle;
  the seatback includes a post receiver that accepts a post of the head restraint when the head restraint is in the extending position;
  the cable of the seatback extends into the post receiver and operably couples with the head restraint within the post receiver when the head restraint is in the extending position and the user-accessible manipulable device is manipulated;
  a gripper attached to the cable of the seatback, and the gripper is disposed within the post receiver;
  the post receiver including an inner wall facing the gripper that forces the gripper to operably couple to the head restraint when the head restraint is in the extending position and the user-accessible manipulable device is manipulated;
  the inner wall of the post receiver having a first portion with a first inner diameter, a second portion with a second inner diameter that is larger than the first inner diameter, and a sloped portion transitioning from the first portion to the second portion where an inner diameter of the sloped portion increases from the first inner diameter to the second inner diameter;
  when the user-accessible manipulable device is not being manipulated and the head restraint is in the extending position, the gripper is adjacent to the second portion of the inner wall of the post receiver;
  as the user-accessible manipulable device is manipulated and the head restraint is in the extending position, the gripper moves from being adjacent to the second portion to contacting the sloped portion and moving toward the first portion and, as a consequence, becomes operably coupled to the head restraint and causes the head restraint to transition from the upright position to the folded position;
  the gripper includes a pair of hook shaped portions that clamp against a portion of the head restraint to become operably coupled to the head restraint;
  the gripper including a single hook shaped portion that inserts into a slot of the head restraint to become operably coupled to the head restraint;
  a seat having an occupant supporting surface;
  the seatback having an occupant supporting surface, an upright position where the occupant supporting surface of the seatback is positioned to support the back of an occupant, and a fold down position where the occupant supporting surface of the seatback faces the occupant supporting surface of the seat;
  when the user-accessible manipulable device is manipulated, the seatback can transition from the upright position to the fold down position, but when the user-accessible manipulable device is not manipulated, the seatback is secured in the upright position;
  when the head restraint is in the extending position and the upright position, the head restraint prevents a child safety seat from abutting a portion of the occupant supporting surface of the seatback, but while the head restraint is in the separated position and the seatback is in the upright position, the child safety seat is able to abut the portion of the occupant supporting surface of the seatback;
  the head restraint including a cable that becomes operably coupled to the seatback to transition the head restraint from the upright position to the folded position when the head restraint is in the extending position;
  the head restraint including a post that is accepted by a post receiver of the seatback when the head restraint is in the extending position but is disposed outside of the post receiver when the head restraint is in the separated position;
  the cable of the head restraint extends into the post of the head restraint and operably couples with the seatback to transition the head restraint from the upright position to the folded position when the head restraint is in the extending position;
  the head restraint including a cable;
  when the head restraint is in the extending position and the user-accessible manipulable device is not manipulated, the cable of the seatback is not operably coupled to the cable of the head restraint, and the head restraint can be transitioned from the extending position to the separated position;

when the head restraint is in the extending position and the user-accessible manipulable device is manipulated, the cable of the seatback operably couples to the cable of the head restraint and thereby causes the head restraint to transition from the upright position to the folded position;

the head restraint including a post, and the cable of the head restraint extends through the post;

the seatback including a post receiver that accepts the post of the head restraint when the head restraint is in the extending position, and the cable of the seatback extends into the post receiver;

the cable of the head restraint and the cable of the seatback operably couple when the head restraint is in the extending position and the user-accessible manipulable device is manipulated;

the seatback further including a gripper attached to the cable of the seatback, and the gripper is disposed within the post receiver;

the post receiver of the seatback including an inner wall facing the gripper that forces the gripper to operably couple to the cable of the head restraint when the head restraint is in the extending position and the user-accessible manipulable device is manipulated;

the inner wall of the post receiver having a first portion with a first inner diameter, a second portion with a second inner diameter that is larger than the first inner diameter, and a sloped portion transitioning from the first portion to the second portion where an inner diameter of the sloped portion increases from the first inner diameter to the second inner diameter;

when the user-accessible manipulable device is not being manipulated and the head restraint is in the extending position, the gripper is adjacent to the second portion of the inner wall of the post receiver;

as the user-accessible manipulable device is manipulated and the head restraint is in the extending position, the gripper moves from being adjacent to the second portion to contacting the sloped portion and moving toward the first portion and, as a consequence, becomes operably coupled to the cable of the head restraint and causes the head restraint to transition from the upright position to the folded position;

the cable of the head restraint terminating in an end with a recess proximate the end; and the gripper including a pair of hook shaped portions that clamp against the recess of the cable of the head restraint to become operably coupled to the head restraint.

According to a second aspect of the present invention, a seating assembly comprises: a head restraint that can be both separated from a seatback to a separated position, and remotely actuated via a user-accessible manipulable device located away from the head restraint to move the head restraint to a folded position when coupled to the seatback in an extending position.

According to a third aspect of the present invention, a vehicle comprises: a seating assembly disposed forward of another seating assembly; the latter seating assembly including a seat having an occupant supporting surface, a seatback having an occupant supporting surface, a head restraint, an upright position where the occupant supporting surface of the seatback is positioned to support the back of an occupant, and a fold down position where the occupant supporting surface of the seatback faces the occupant supporting surface of the seat. The head restraint includes: an extending position where the head restraint extends from the seatback; a separated position where the head restraint is separated from the seatback; an upright position when the head restraint is in the extending position, and the seatback is in the upright position, where an occupant supporting surface of the head restraint is positioned to support a head of the occupant; and a folded position, when the head restraint is in the extending position, where the occupant supporting surface of the head restraint is positioned differently than when the head restraint is in the upright position. While the head restraint is in the extending position, the head restraint contacts the forward seating assembly when the head restraint is in the upright position as the seatback transitions from the upright position toward the fold down position, but the head restraint does not contact the forward seating assembly when the head restraint is in the folded position as the seatback transitions from the upright position to the fold down position. While the head restraint is in the extending position and the seatback is in the upright position, the head restraint prevents a child safety seat from abutting a portion of the occupant supporting surface of the seatback, but while the head restraint is in the separated position and the seatback is in the upright position, the child safety seat abuts the portion of the occupant supporting surface of the seatback.

These and other aspects, objects, and features of the present invention will be understood and appreciated by those skilled in the art upon studying the following specification, claims, and appended drawings.

DETAILED DESCRIPTION OF THE PREFERRED EMBODIMENTS

It is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
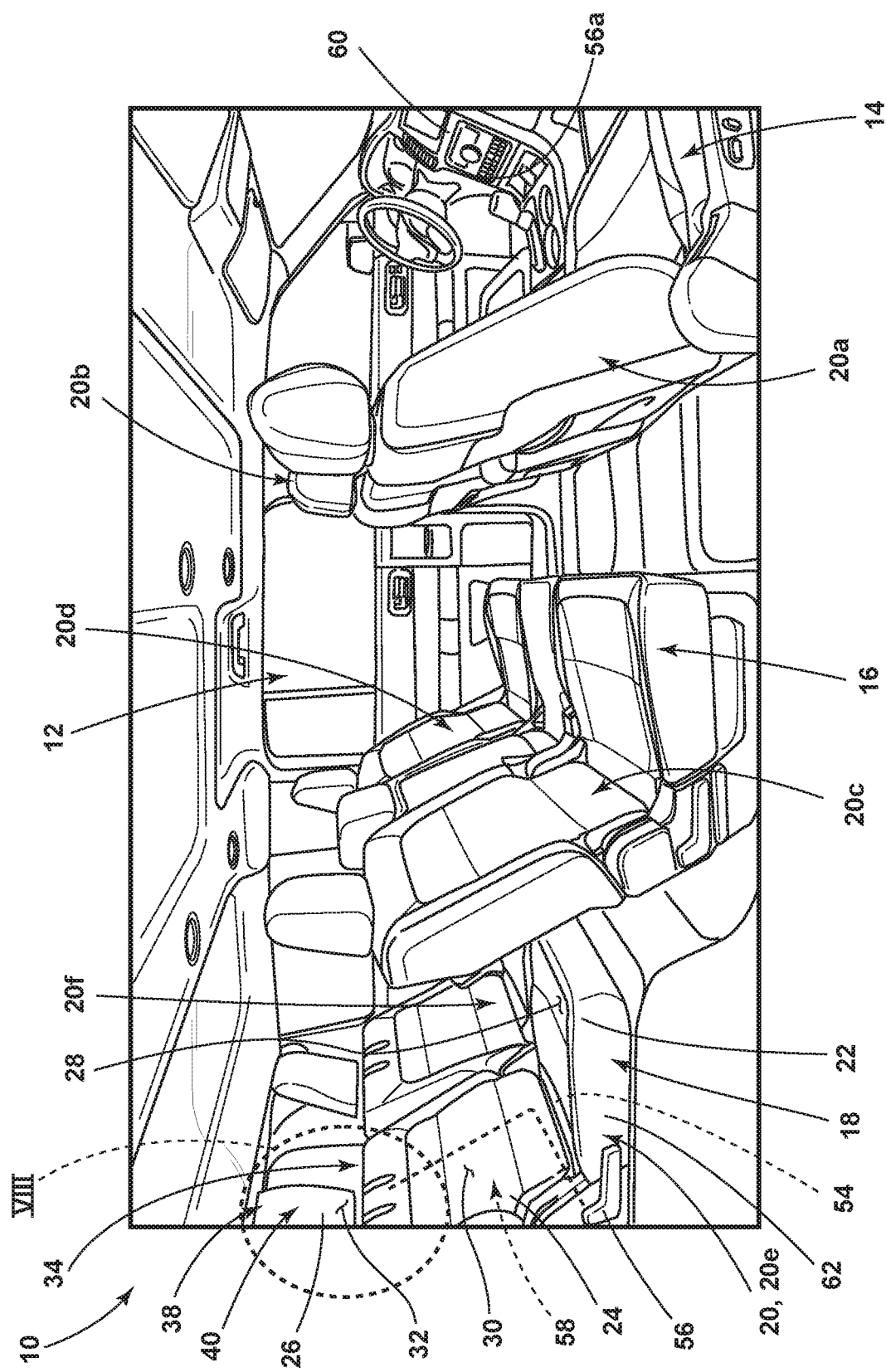
FIG. 1 is a perspective view of an interior of a vehicle, illustrating a seating assembly of a third row of seating rearward of a seating assembly of a second row of seating, the seating assembly of the third row of seating having a seatback in an upright position, a head restraint in an upright position while extending from the seatback in an extending position, and a user-accessible manipulable device that, when manipulated, transitions the head restraint from the extending position to a folded position (see FIG. 2)

For purposes of description herein, the terms "forward" and "rearward," and derivatives thereof, shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a vehicle 10 includes an interior 12. The vehicle 10 further includes a first row of seating 14. The vehicle 10 further includes a second row of seating 16, with the first row of seating 14 disposed forward of the second row of seating 16. The vehicle 10 further includes a third row of seating 18, with the second row of seating 16 disposed forward of the third row of seating 18. The vehicle 10 could include more or less than the three rows of seating 14, 16, 18 of the illustrated embodiment, without departing from the concepts disclosed, and the illustrated vehicle 10 with the three rows of seating 14, 16, 18 is merely exemplary. Each row of seating 14, 16, 18 includes at least one seating assembly 20. For example, the first row of seating 14 includes a seating assembly 20a and a seating assembly 20b. The second row of seating 16 and the third row of seating 18 likewise include seating assemblies 20c, 20d, 20e, and 20f. As the second row of seating 16 is disposed forward of the third row of seating 18, the seating assembly 20c of the second row of seating 16 is disposed forward of the seating assembly 20e of the third row of seating 18. The remainder of the detailed description will focus on the seating assembly 20e of the third row of seating 18. It should be understood that each of the seating assemblies 20 (including 20a, 20b, 20c, 20d, and 20f) could incorporate the features discussed herein. The vehicle 10 can be a car, truck, sports utility vehicle, van, bus, or any like transportation apparatus.

Figure 2:
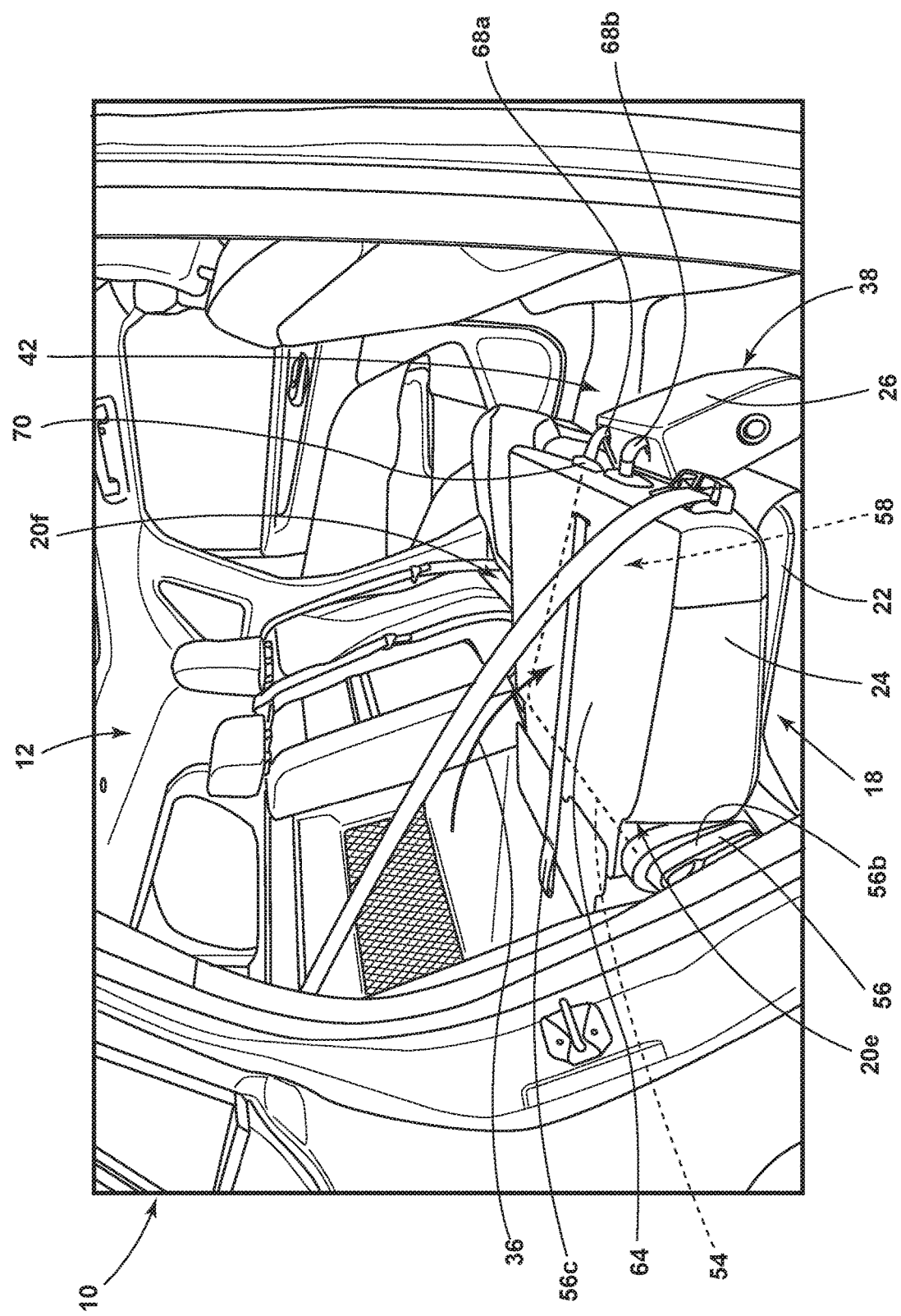
FIG. 2 is a perspective view of the seating assembly of the third row of seating of FIG. 1, with the seatback in a fold down position and the head restraint in a folded position.
Figure 3:
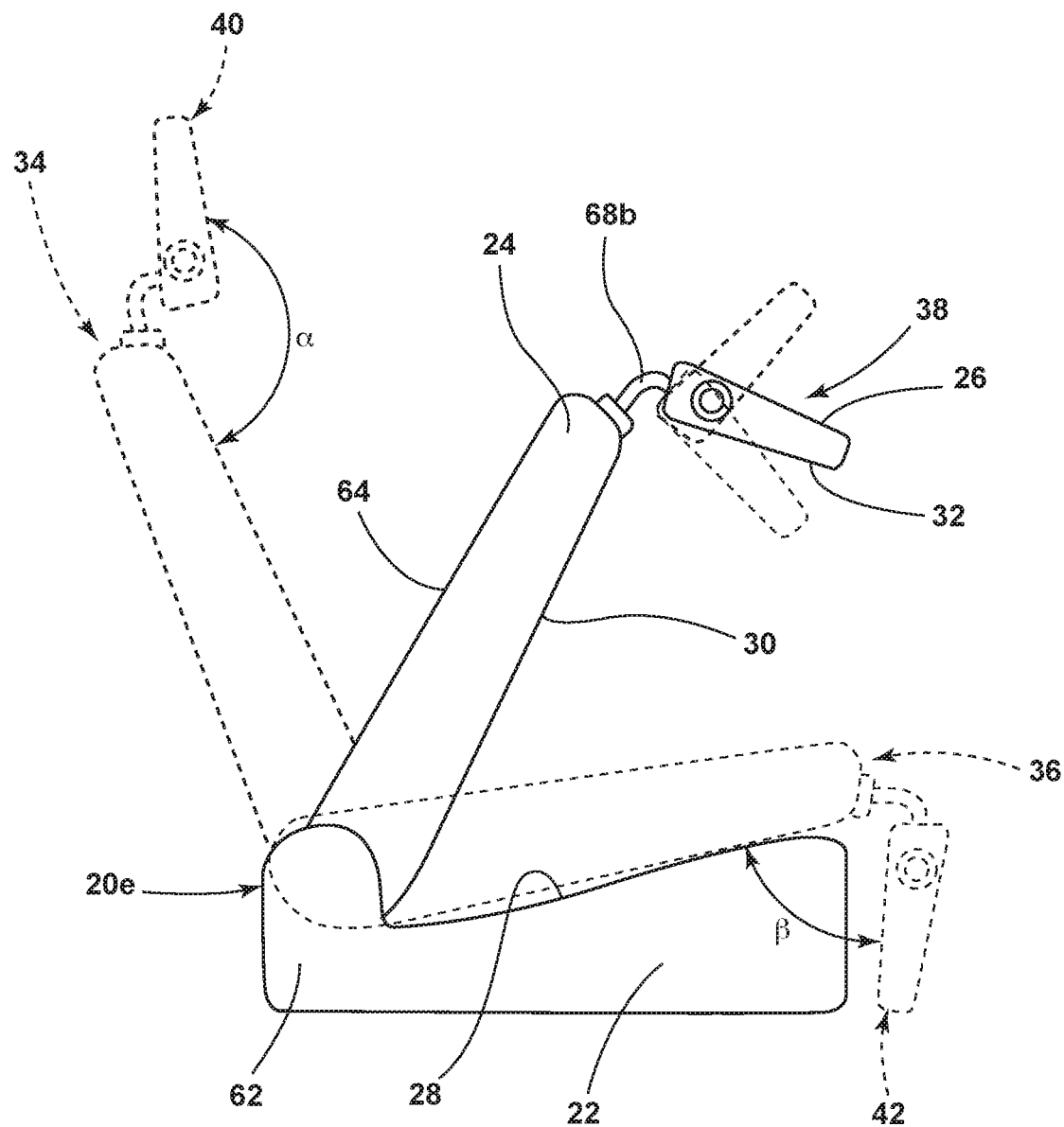
FIG. 3 is side view of the seating assembly of FIG. 2, illustrating the seatback transitioning from the upright position to the fold down position over a seat of the seating assembly, and the head restraint transitioning from the upright position to the fold down position while extending from the seatback in the extending position.

Referring now additionally to FIGS. 2 and 3, the seating assembly 20e includes a seat 22, a seatback 24, and a head restraint 26. The seat 22 includes an occupant supporting surface 28. The seatback 24 includes an occupant supporting surface 30. The head restraint 26 includes an occupant supporting surface 32. The seatback 24 can transition (FIG. 3) to, from, and between an upright position 34 (FIG. 1) and a fold down position 36 (FIG. 2). In the upright position 34 (FIG. 1), the occupant supporting surface 30 of the seatback 24 is generally configured to contact the back of an occupant (not illustrated) of the seating assembly 20e. In the upright position 34, the occupant supporting surface 28 of the seat 22 is generally configured to contact the bottom and legs of the occupant. In the fold down position 36 (FIG. 2), the seatback 24 is rotated over the seat 22, such that the occupant supporting surface 30 of the seatback 24 faces the occupant supporting surface 28 of the seat 22.

The head restraint 26 includes an extending position 38 (FIGS. 1-3). In the extending position 38, the head restraint 26 extends from the seatback 24. When the head restraint 26 is in the extending position 38, the head restraint 26 can transition (FIG. 3) to, from, and between an upright position 40 (FIG. 1) and a folded position 42 (FIG. 2). When the head restraint 26 is in the extending position 38 extending from the seatback 24, and the seatback 24 is in the upright position 34 (FIG. 1), in the upright position 40 of the head restraint 26, the occupant supporting surface 32 of the head restraint 26 is positioned to support the head of the occupant. When the head restraint 26 is in the folded position 42 (FIG. 2), the occupant supporting surface 32 of the head restraint 26 is positioned differently than when the head restraint 26 is in the upright position 40. For example, the occupant supporting surface 32 of the head restraint 26 and the occupant supporting surface 30 of the seatback 24 can form an angle α when the head restraint 26 is in the upright position 40, and the occupant supporting surface 32 of the head restraint 26 and the occupant supporting surface 30 of the seatback 24 can form an angle 3 when the head restraint 26 is in the folded position 42, with the angle 3 being less than the angle α.

Figure 4:
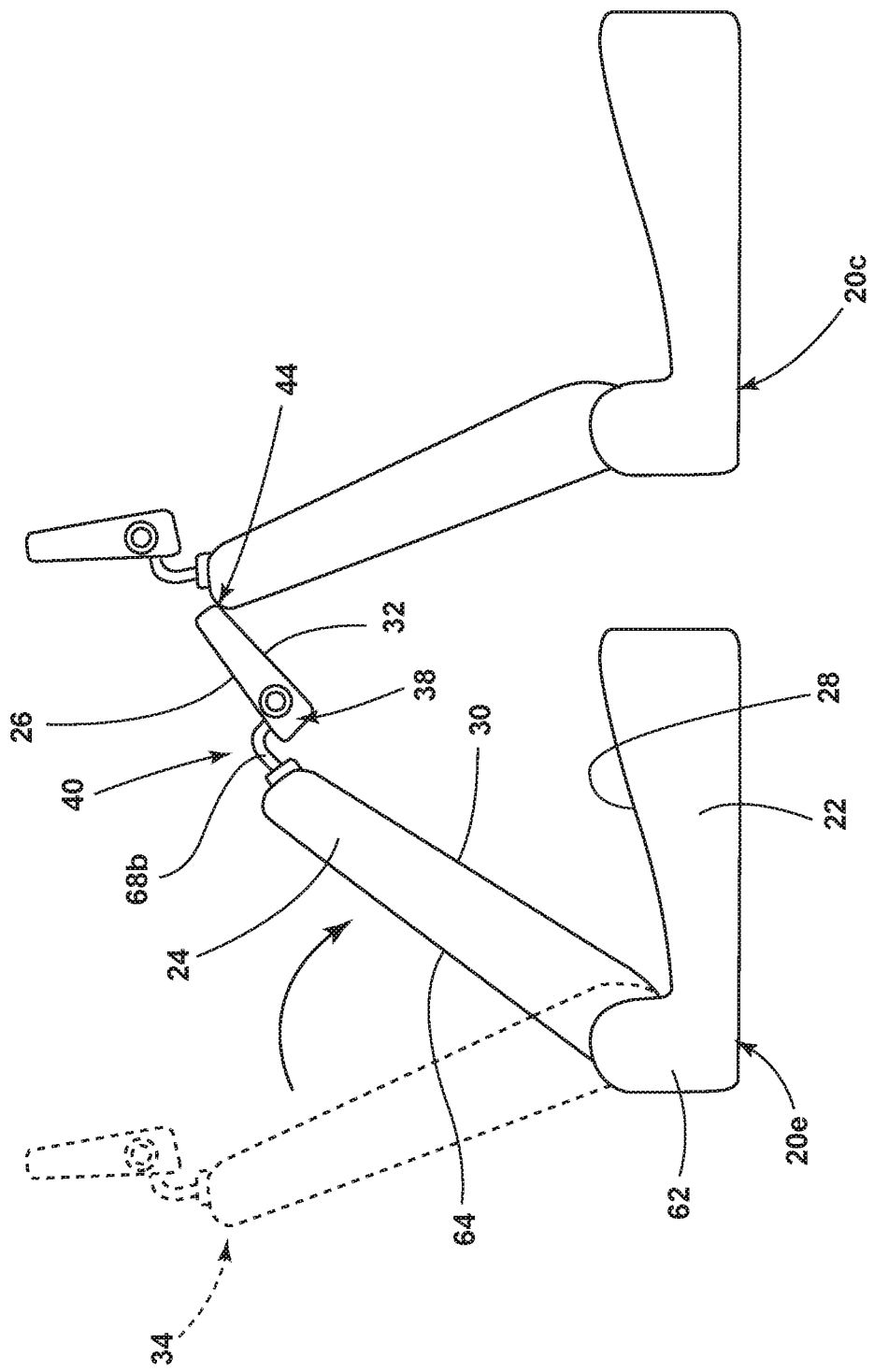
FIG. 4 is side view of the seating assembly of FIG. 2 and the seating assembly of the second row of seating of FIG. 1, illustrating the rearward seating assembly transitioning from the upright position toward the fold down position but the head restraint hindering the transition by contacting the forward seating assembly because the head restraint is in the upright position.
Figure 5:
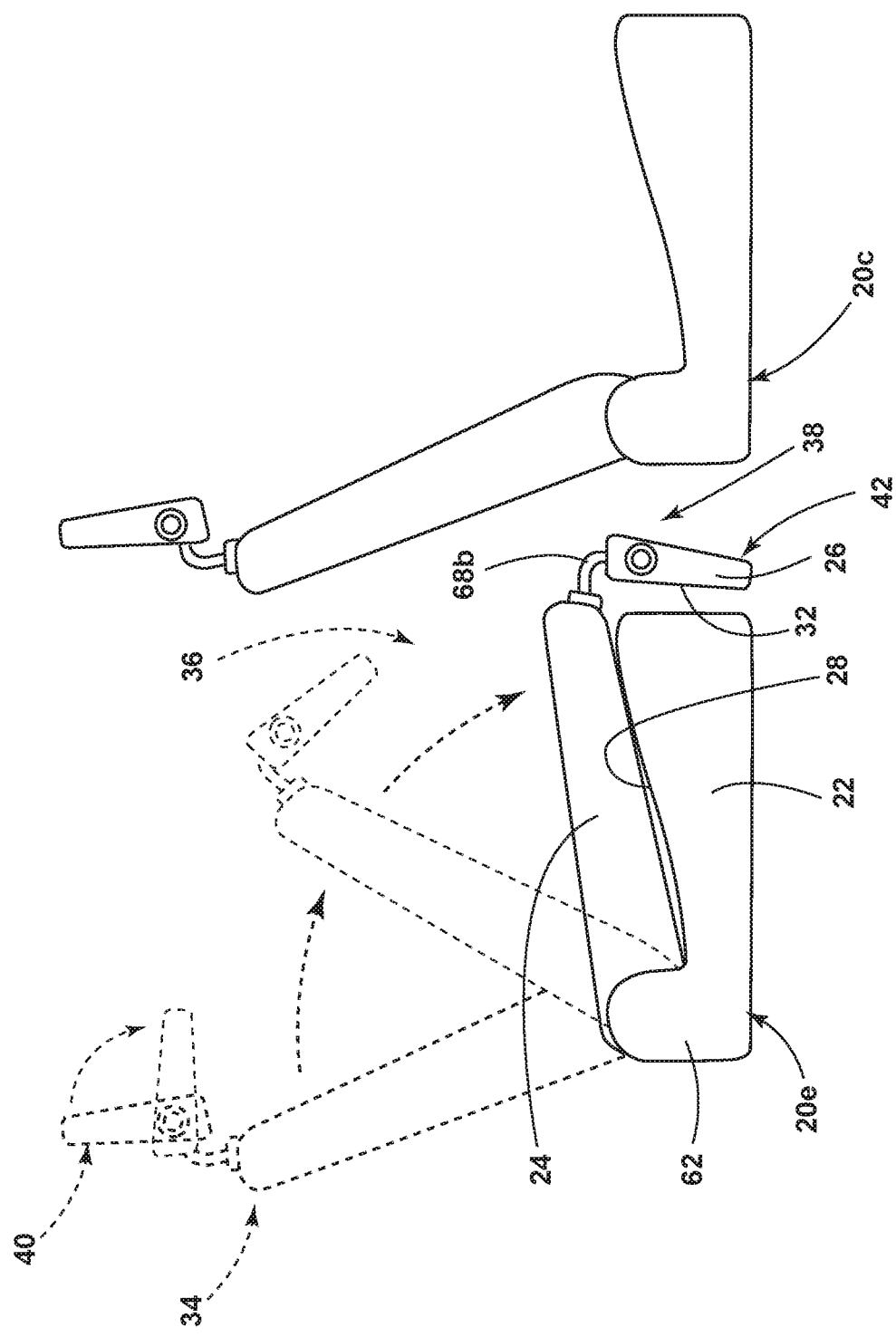
FIG. 5 is a side view showing the same situation as FIG. 4, but illustrating the rearward seating assembly fully transitioning from the upright position to the fold down position without contacting the forward seating assembly because the head restraint is in the folded position while still extending from the seating assembly in the extending position.

Referring now additionally to FIGS. 4 and 5, in the illustrated embodiment, when the head restraint 26 is in the extending position 38 and the upright position 40 (FIG. 4), and the seatback 24 is in the upright position 34, the head restraint 26 contacts 44 the seating assembly 20c of the first row of seating 14 as the seatback 24 transitions from the upright position 34 toward the fold down position 36. Thus, if the head restraint 26 remains in the upright position 40, the seatback 24 cannot transition fully to the fold down position 36. However, when the head restraint 26 is in the folded position 42 (FIG. 5), the head restraint 26 does not contact 44 the seating assembly 20c of the first row of seating 14, as the seatback 24 transitions from the upright position 34 to the fold down position 36.

Figure 6:
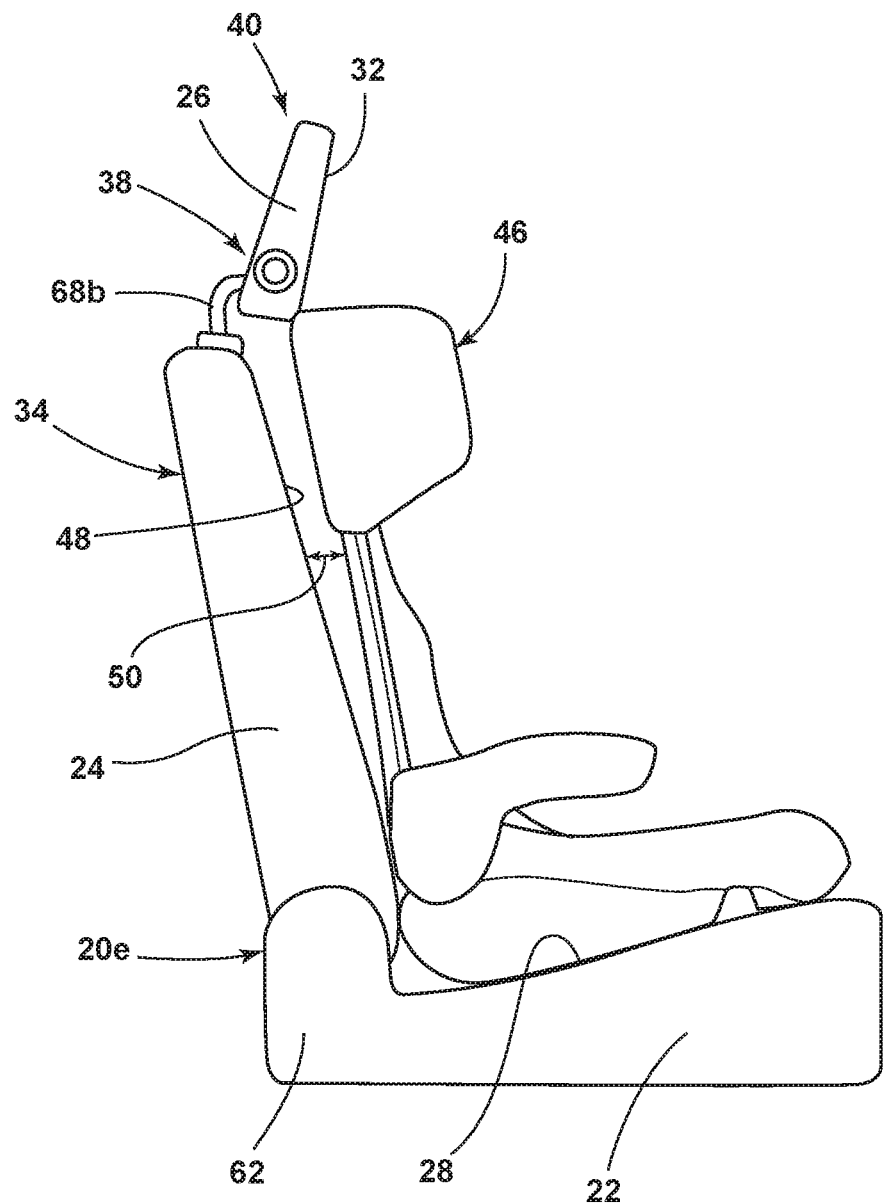
FIG. 6 is a perspective view of the seating assembly of FIG. 2, illustrating the head restraint extending from the seatback in an extending position precluding a child safety seat disposed on the seating assembly from abutting a portion of the seatback and causing a gap between the portion and the child safety seat.
Figure 7:
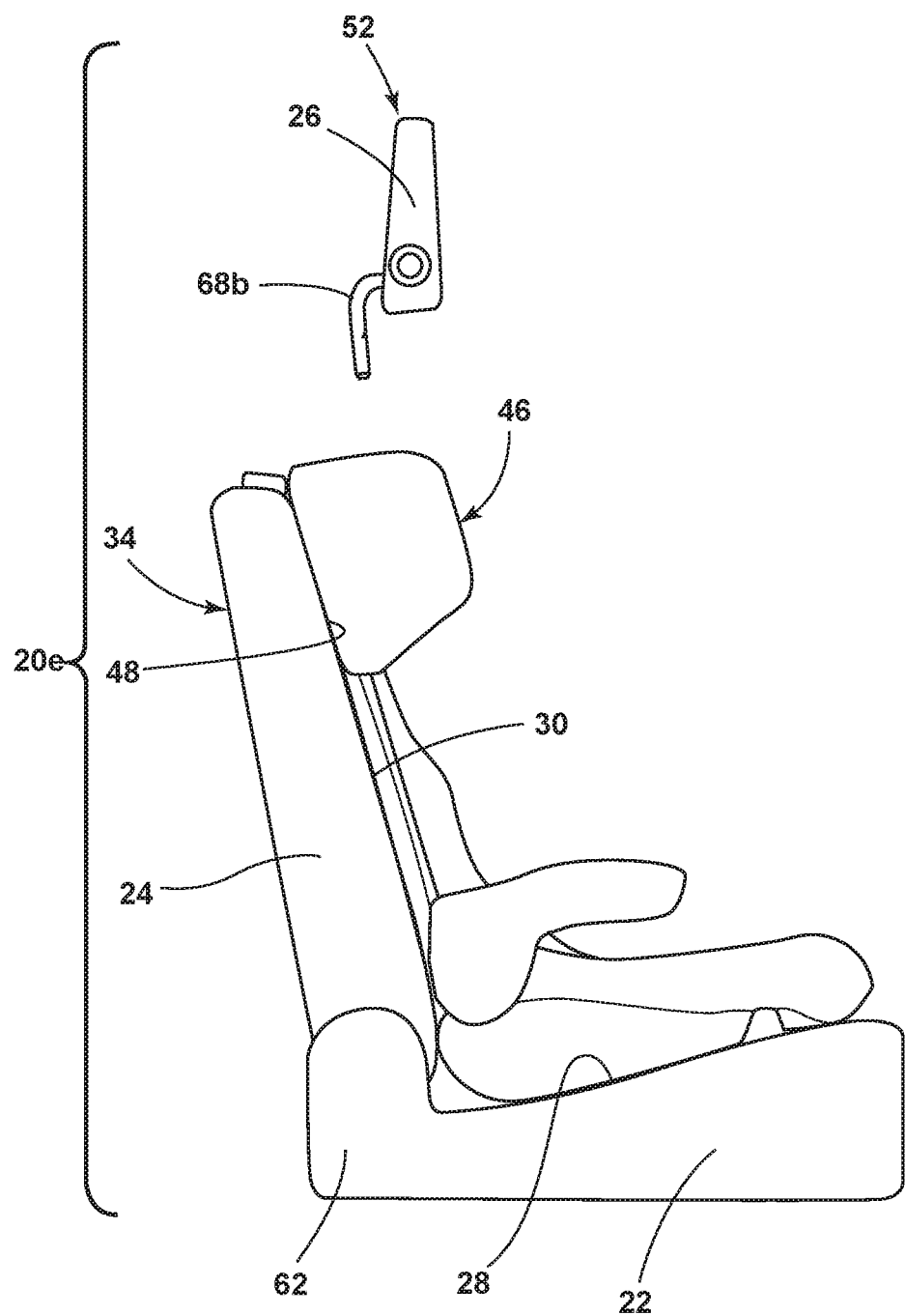
FIG. 7 is a perspective view of the seating assembly of FIG. 2, illustrating the head restraint have been separated from the seatback to a separated position thus allowing the child safety seat to abut the portion of the seatback and not causing the gap between the portion and the child safety seat.

Referring now additionally to FIGS. 6 and 7, in the illustrated embodiment, while the head restraint 26 is in the extending position 38 (FIG. 6) and the seatback 24 is in the upright position 34, the head restraint 26 prevents a child safety seat 46 placed on the seating assembly 20e from abutting a portion 48 of the occupant supporting surface 30 of the seatback 24. The head restraint 26 causes a gap 50 between the portion 48 of the occupant supporting surface 30 of the seatback 24 and the child safety seat 46. However, in addition to the extending position 38 (FIG. 6), the head restraint 26 can take a separated position 52 (FIG. 7). In the separated position 52, the head restraint 26 is separated from the seatback 24. For example, in the separated position 52, the head restraint 26 is not attached to the seatback 24 and the seatback 24 is not supporting the head restraint 26 as the seatback 24 does in the extending position 38. In the separated position 52, the head restraint 26 could be disposed elsewhere in the interior 12 of the vehicle 10 or not in the vehicle 10 at all. While the head restraint 26 is in the separated position 52 and the seatback 24 is in the upright position 34, the child safety seat 46 is able to abut and does abut the portion 48 of the occupant supporting surface 30 of the seatback 24 that the head restraint 26 prevented the child safety seat 46 from abutting in the extending position 38 and the upright position 40. The head restraint 26 taking the separated position 52 closes or eliminates the gap 50 between the occupant supporting surface 30 of the seatback 24 and the child safety seat 46 that the head restraint 26 caused while in the extending position 38.

Figure 8:
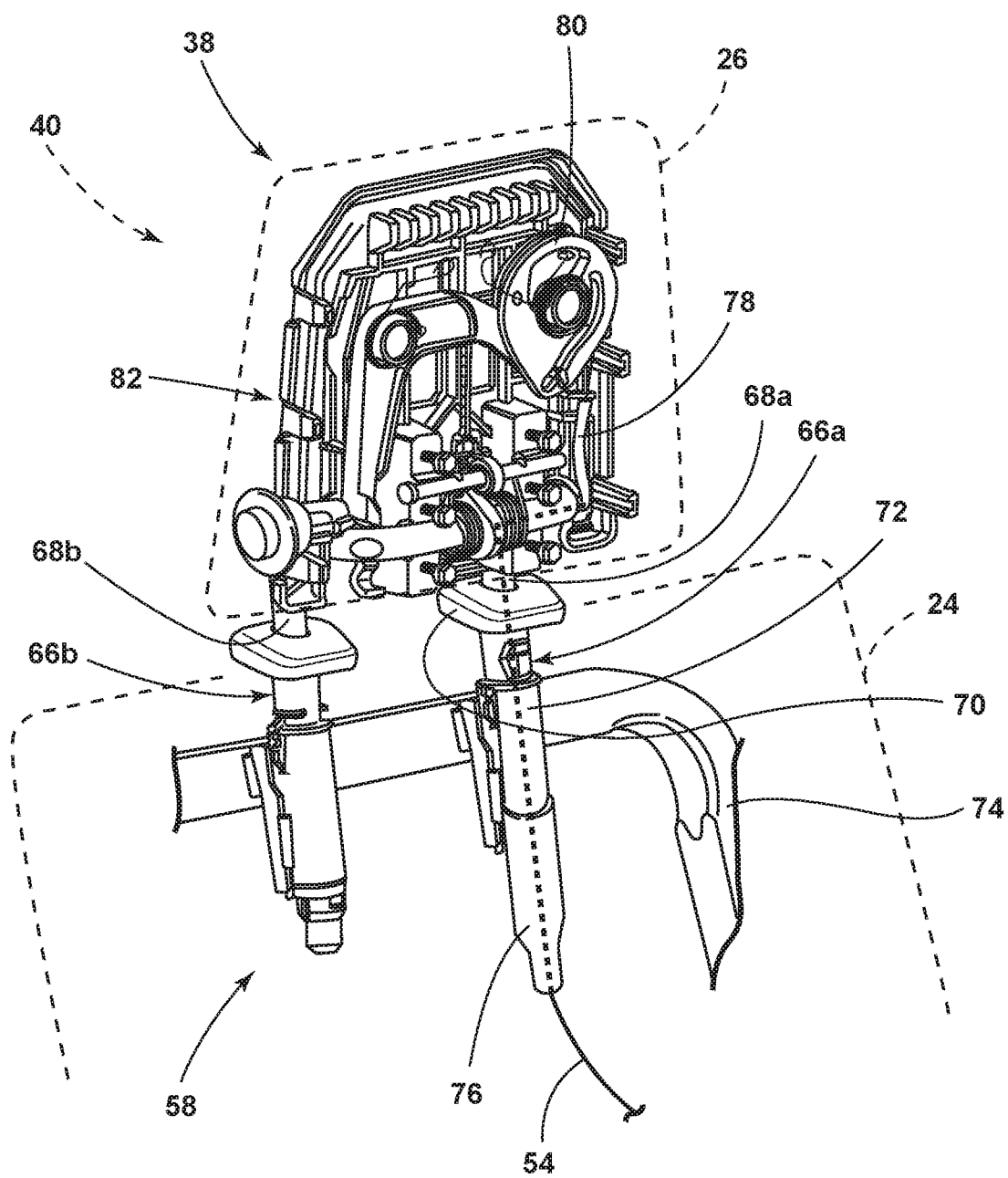
FIG. 8 is a perspective view into an interior of the seatback and the head restraint of the seating assembly of FIG. 2, illustrating a cable communicating with a folding mechanism within the interior of the head restraint and a cable extending through the interior of the seatback, with the cable of the head restraint and the cable of the seatback extending into a post receiver that receives a post of the head restraint when the head restraint is extending from the seatback in the extending position.

Referring now back to FIGS. 1 and 2, and additionally to FIG. 8, to manipulate the transition of the head restraint 26 from the upright position 40 to the folded position 42, the seatback 24 includes a cable 54 and a user-accessible manipulable device 56 in operable communication with the cable 54. The cable 54 extends through an interior 58 of the seatback 24. The user-accessible manipulable device 56 can be a button 56a such as at a center console 60 of the vehicle 10, a handle 56b such as at a side 62 of the seating assembly 20e, or a belt loop 56c accessible at a rear 64 of the seatback 24. These examples are not intended to be limiting. Regardless of what form the user-accessible manipulable device 56 takes, the user-accessible manipulable device 56, when manipulated, moves the cable 54. The movement of the cable 54 causes a transition of the head restraint 26 from the upright position 40 to the folded position 42 when the head restraint 26 is in the extending position 38, as elaborated upon below. The seatback 24 includes several post receivers 66 (that is, 66a and 66b), but could include just one post receiver 66 (such as 66a). Each post receiver 66 accepts a post 68 of the head restraint 26, when the head restraint 26 is in the extending position 38. For example, the post receiver 66a accepts post 68a, and post receiver 66b accepts post 68b. The post 68 of the head restraint 26 is (or the posts 68a, 68b of the head restraint 26 are, if multiple posts 68a, 68b are utilized) disposed outside of the post receiver 66a, 66b when the head restraint 26 is in the separated position 52. The post receiver 66 can be a single piece or can be composed of several pieces such as a guide sleeve 70, a support structure 72 that attaches the guide sleeve 70 to a frame 74 of the seatback 24, and a junction housing 76, which is further discussed below. The guide sleeve 70 is typically disposed at the seatback 24, partially externally and partially internally.

The head restraint 26 also includes a cable 78 that at least partially extends within an interior of the head restraint 26. The cable 78 is connected to a folding mechanism 80 within an interior 82 of the head restraint 26 that operates to transition the head restraint 26 from the upright position 40 to the folded position 42, when the cable 78 is manipulated. The cable 78 becomes operably coupled to the seatback 24, particularly the cable 54 of the seatback 24, to transition the head restraint 26 from the upright position 40 to the folded position 42 when the head restraint 26 is in the extending position 38. The user-accessible manipulable device 56 manipulates the cable 54 of the seatback 24 (such as by imparting a pulling force 84), and the movement of the cable 54 of the seatback 24 causes the cable 54 of the seatback 24 and the cable 78 of the head restraint 26 to become operably coupled. The movement of the cable 54 of the seatback 24 thus causes movement of the cable 78 of the head restraint 26, which causes the folding mechanism 80 to transition the head restraint 26 from the upright position 40 to the folded position 42.

Figure 9:
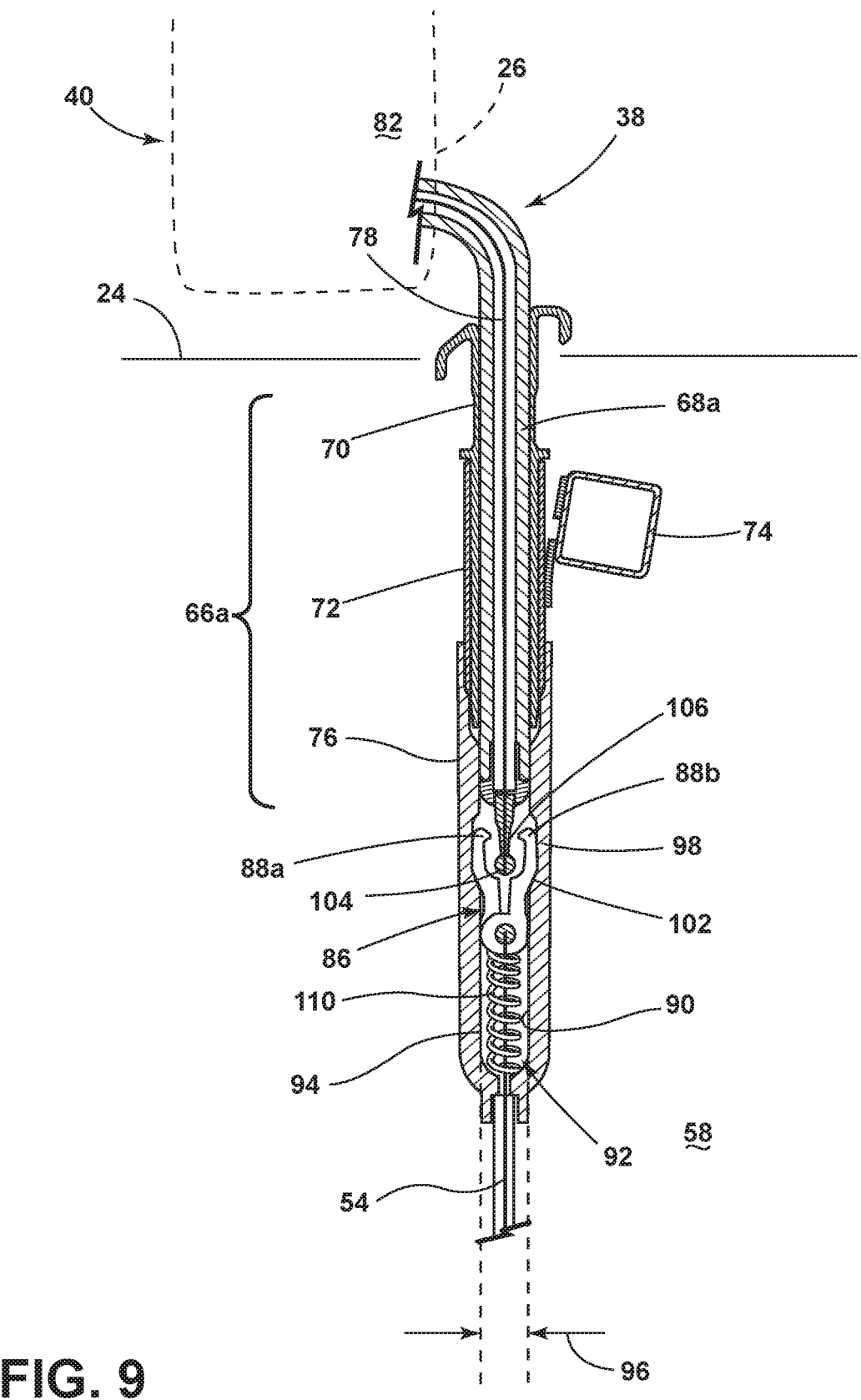
FIG. 9 is a side cross-sectional view of the seating assembly of FIG. 2, illustrating the head restraint extending from the seatback in the extending position, with the cable of the seatback not operably coupled to the cable of the head restraint.

Referring now to FIGS. 9-12, the mechanism by which the cable 54 of the seatback 24 and the cable 78 of the head restraint 26 operably couple only when the head restraint 26 is in the extending position 38 and the user-accessible manipulable device 56 is manipulated is discussed. In FIG. 9, the user-accessible manipulable device 56 is not being manipulated and, therefore, the cable 54 of the seatback 24 is not operably coupled with the head restraint 26 (particularly, the cable 78 of the head restraint 26). More specifically, in the illustrated embodiment, the seatback 24 includes a gripper 86 attached to the cable 54 of the seatback 24. The gripper 86 is disposed within the post receiver 66a. In the illustrated embodiment, the gripper 86 is disposed in the junction housing 76 of the post receiver 66a. The gripper 86 includes a pair of hook shaped portions 88a, 88b the purpose of which is discussed further below.

The post receiver 66a, such as the junction housing 76 component, includes an inner wall 90 that forms a chamber 92, into which the cable 54 of the seatback 24 extends. The inner wall 90 has a first portion 94 with a first inner diameter 96. The inner wall 90 has a second portion 98 with a second inner diameter 100. The second inner diameter 100 is larger than the first inner diameter 96, and disposed closer to the guide sleeve 70 than the first inner diameter 96. The inner wall 90 further includes a sloped portion 102 transitioning from the first portion 94 to the second portion 98 where the inner diameter increases from the first inner diameter 96 to the second inner diameter 100. When the user-accessible manipulable device 56 is not being manipulated and the head restraint 26 is in the extending position 38 (as is the configuration illustrated in FIG. 9), the gripper 86 is adjacent to the second portion 98 of the inner wall 90 (such as contacts the inner wall 90 of the second portion 98, but it need not contact).

The cable 78 of the head restraint 26 extends into the post 68a of the head restraint 26. The cable 78 of the head restraint 26 terminates in an end 104, which can be disposed outside of the post 68a. The cable 78 of the head restraint 26 has a recess 106 (such as an indention, slot, or some other recess into which the gripper 86, such as the hook shaped portions 88a, 88b, can grasp). When the user-accessible manipulable device 56 is not manipulated, the gripper 86 does not clamp against the recess 106 of the cable 78 of the head restraint 26 and thus the two cables 54, 78, of the seatback 24 and the head restraint 26 are not operably coupled.

Figure 10:
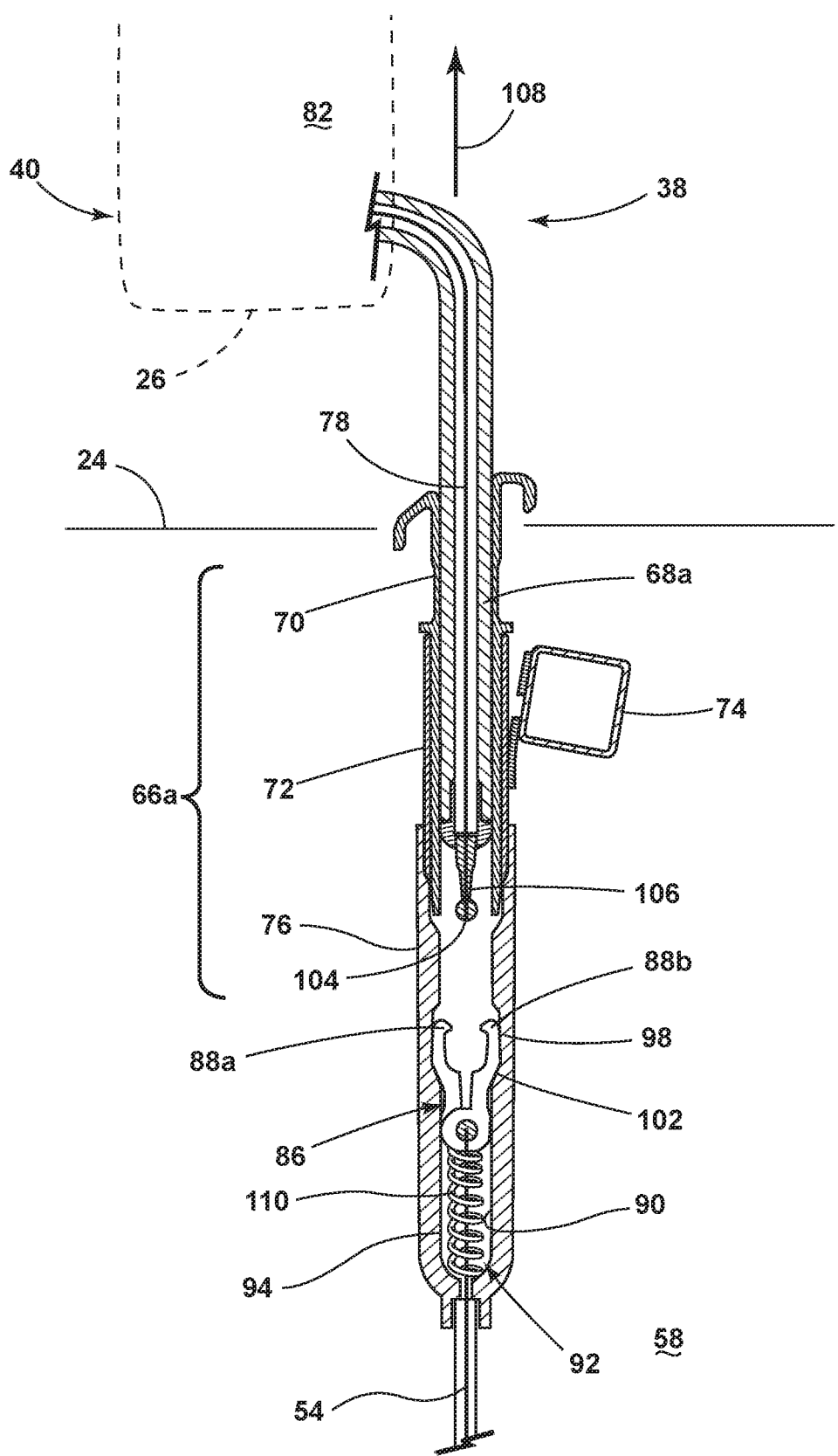
FIG. 10 is a side cross-sectional view of the seating assembly of FIG. 2, like FIG. 9, but showing a pulling force applied to the head restraint to transition the head restraint from the extending position toward the separated position as in FIG. 7, the pulling force being effective because the cable of the seatback and the cable of the head restraint are not operably coupled.

Referring now to FIG. 10, because the cable 54 of the seatback 24 and the cable 78 of the head restraint 26 are not operably coupled, a pulling force 108 can withdraw the post 68a of the head restraint 26 from the post receiver 66a of the seatback 24, causing the head restraint 26 to transition from the extending position 38 to the separated position 52. In other words, when the head restraint 26 is in the extending position 38 and the user-accessible manipulable device 56 is not manipulated, the cable 54 of the seatback 24 is not operably coupled to the cable 78 of the head restraint 26, and the head restraint 26 is free to be transitioned from the extending position 38 to the separated position 52. Likewise, if the head restraint 26 is in the separated position 52, then the post 68a of the head restraint 26 can be reinserted back into the post receiver 66a of the seatback 24. A spring 110 biases the gripper 86 to be adjacent to the second portion 98, when the pulling force 84 is not applied.

Figure 11:
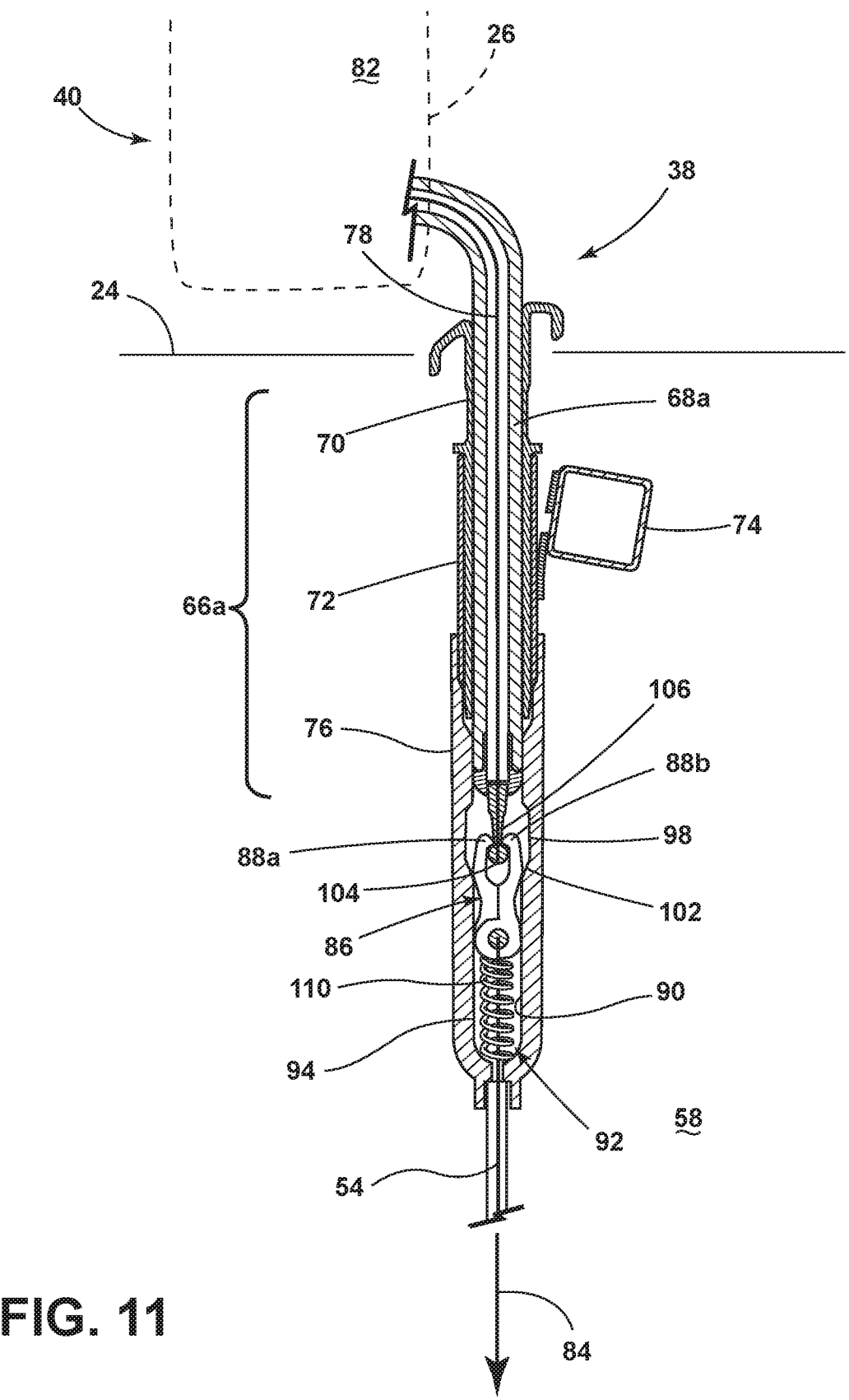
FIG. 11 is a side cross-sectional view of the seating assembly of FIG. 2, like FIG. 9, but showing a pulling force applied to the cable of the seatback (because the user-accessible manipulable device of FIG. 1 is being manipulated), and a decreasing diameter of an inner wall of the post receiver of the seatback forcing a gripper attached to the cable of the seatback to grip (and become operably coupled to) a recess adjacent an end of the cable of the head restraint.

Referring now to FIG. 11, when the user-accessible manipulable device 56 is manipulated and the head restraint 26 is in the extending position 38, the pulling force 84 is exerted on the cable 54 of the seatback 24. The pulling force 84 on the cable 54 causes the gripper 86 to move from being adjacent to the second portion 98 to contacting the sloped portion 102 and moving toward the first portion 94. The inner wall 90 of the post receiver 66a (in this embodiment, the junction housing 76 thereof) facing the gripper 86 forces the gripper 86 to operably couple to the cable 78 of the head restraint 26. More specifically, the decrease in the inner diameter of the inner wall 90 of the junction housing 76 from the second inner diameter 100 to the first inner diameter 96 forces each gripper 86 toward the cable 78 of the head restraint 26. Eventually, the pair of hook shaped portions 88a, 88b of the gripper 86 clamp against a portion of the head restraint 26 (in this embodiment, the recess 106 of the cable 78 of the head restraint 26) and thereby becomes operably coupled to the head restraint 26 (that is, to the cable 78 of the head restraint 26). In short, the cable 78 of the head restraint 26 and the cable 54 of the seatback 24 operably couple when the head restraint 26 is in the extending position 38 and the user-accessible manipulable device 56 is manipulated. The operable coupling between the cable 54 of the seatback 24 and the cable 78 of the head restraint 26 occurs within the post receiver 66a, in this embodiment, in the junction housing 76 thereof. The end 104 of the cable 78 of the head restraint 26 can be ball shaped to help prevent the gripper 86 of the cable 54 of the seatback 24 from losing grip of the cable 78 of the head restraint 26.

Figure 12:
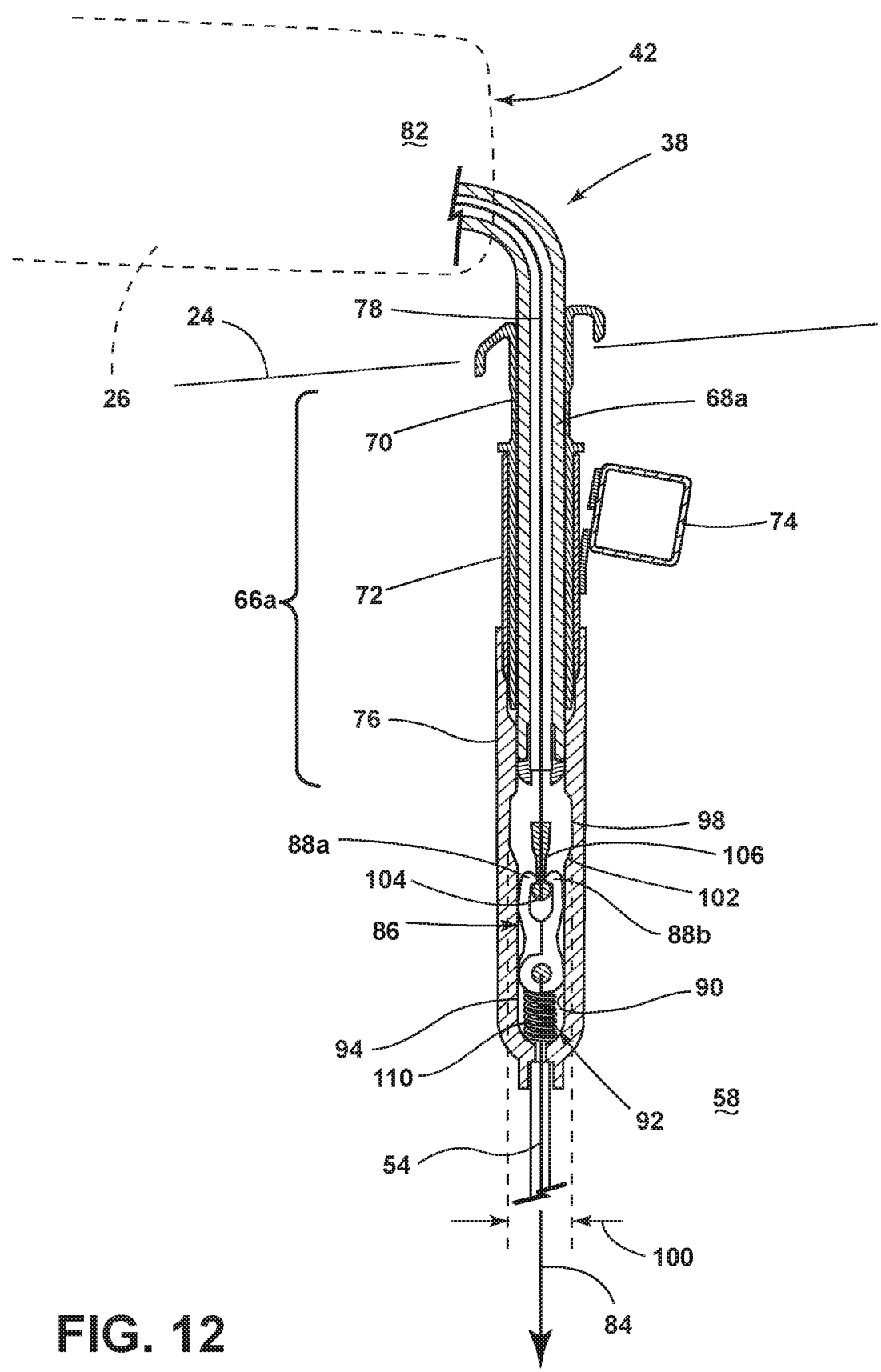
FIG. 12 is a side cross-sectional view of the seating assembly of FIG. 2, illustrating the continuation of the pulling force of FIG. 11, which causes the pulling of the cable of the head restraint, because the cable of the seatback and the cable of the head restraint are now operably coupled, the pulling of the cable of the head restraint causing the head restraint to transition from the upright position to the folded position.

Referring now to FIG. 12, as the pulling force 84 on the cable 54 of the seatback 24 pulls the cable 54, the gripper 86 contacts the first portion 94 of the junction housing 76. The inner wall 90 of the first portion 94 causes the gripper 86 to maintain the operable connection with the cable 78 of the head restraint 26. The gripper 86 thus pulls the cable 78 of the head restraint 26, which triggers the folding mechanism 80 of the head restraint 26. The head restraint 26 as a result transitions from the upright position 40 to the folded position 42. To summarize, then, when the head restraint 26 is in the extending position 38 and the user-accessible manipulable device 56 is manipulated, the cable 54 of the seatback 24 operably couples to the cable 78 of the head restraint 26 and thereby causes the head restraint 26 to transition from the upright position 40 to the folded position 42.

As previously mentioned, the user-accessible manipulable device 56 can be the handle 56b at the side 62 of the seating assembly 20e. In addition to causing the head restraint 26 to transition from the upright position 40 to the folded position 42, manipulation of the handle (the user-accessible manipulable device 56) can simultaneously cause the seatback 24 to transition from the upright position 34 to the fold down position 36. When the user-accessible manipulable device 56 is not manipulated and the seatback 24 is in the upright position 34, then the seatback 24 is secured in the upright position 34.

Figure 13:
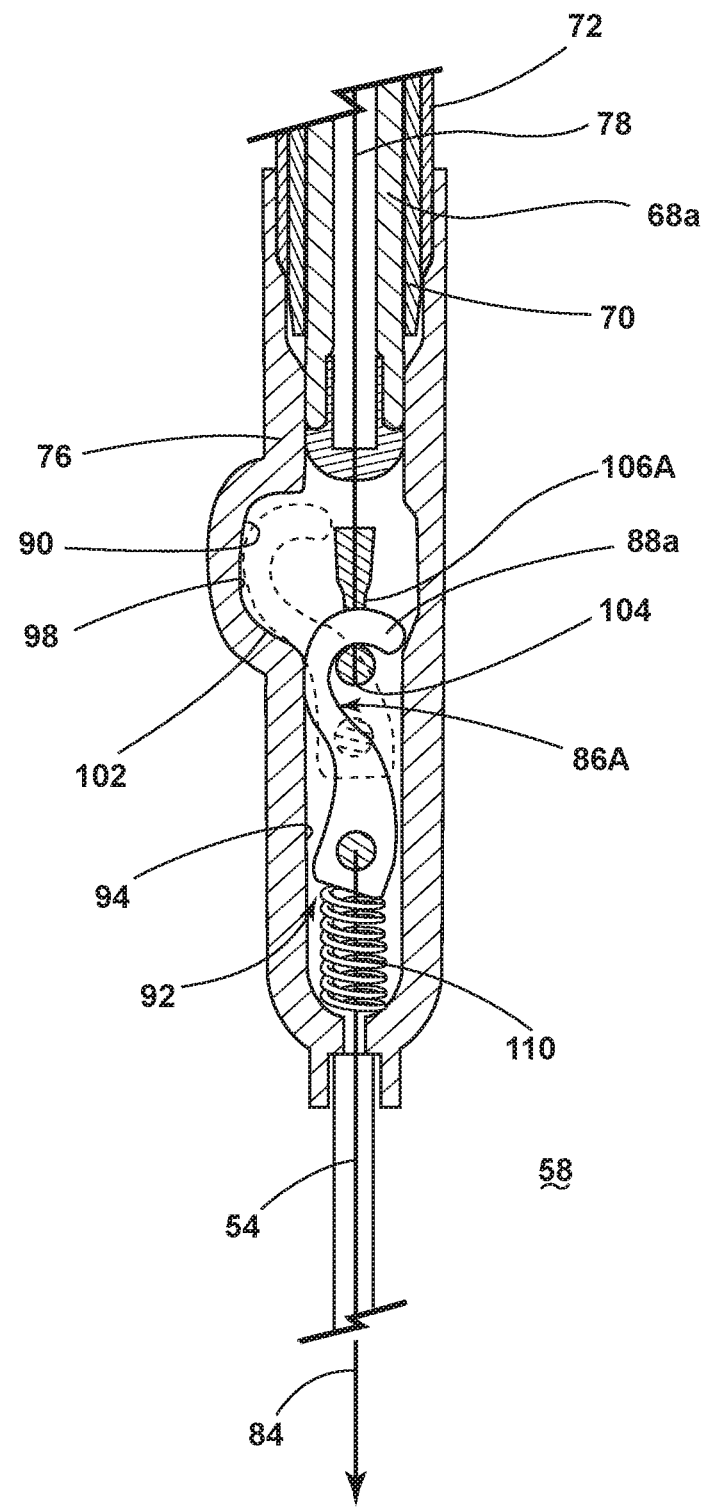
FIG. 13 is a side cross-sectional view of the seating assembly of FIG. 2, like FIG. 12, but illustrating an alternative embodiment of the gripper as having a single hooked end that enters a slot adjacent the end of the cable of the head restraint to operably couple the cable of the seatback and the cable of the head restraint.

Referring now to FIG. 13, in an alternative embodiment of the gripper 86, a gripper 86A, a single hook shaped portion 88a is utilized instead of the pair of hooks 88a, 88b. A recess 106A of the cable 78 of the head restraint 26 is a slot. As the pulling force 84 pulls the cable 54 of the seatback 24, the sloped portion 102 of the inner wall 90 of the junction housing 76 forces the single hook shaped portion 88a of the gripper 86A into the slot of the cable 78 of the head restraint 26, causing the cable 54 of the seatback 24 to become operably coupled to the cable 78 of the head restraint 26.

The disclosure thus solves the problem of a remotely actuated (via the user-accessible manipulable device) folding head restraint not being removable from the seatback (thus hindering proper placement of the child safety seat) because the same cable extends through the seatback and into the head restraint. The cable, which extended unseparated through the seatback and into the head restraint, prevented separation of the head restraint from the seatback (the cable essentially connected the head restraint to the seatback). In short, the seating assembly 20e of the disclosure has the head restraint 26 that includes the cable 78 that is operably coupled to the user-accessible manipulable device 56 that is located away from the head restraint 26 (i.e., remotely located) when the user-accessible manipulable device 56 is manipulated by a user to move the head restraint 26 to the folded position 42 but is not coupled to the user-accessible manipulable device 56 when the user-accessible manipulable device 56 is not manipulated by the user. This selective coupling and decoupling between the cable 78 of the head restraint 26 and the user-accessible manipulable device 56 (via the cable 54 of the seatback 24) allows the head restraint 26 to be separable from the seatback 24 when the cable 78 is not coupled to the user-accessible manipulable device 56. The head restraint 26 can both be separated from the seatback 24 to the separated position 52 yet remotely actuated via a user-accessible manipulable device 56 located away from the head restraint 26 to move the head restraint 26 to the folded position 42 when coupled to the seatback 24 in the extending position 38.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the afore-mentioned structure without departure from the concepts of the present disclosure, and further it is to be understood that such concepts are intended to be covered by the following claims unless these claims by their language expressly state otherwise.

What is claimed is:

1. A seating assembly for a vehicle comprising:
   a seatback comprising: a cable extending through an interior of the seatback; and a user-accessible manipulable device coupled to the cable; and
   a head restraint comprising:
      a cable;
      an extending position where the head restraint extends from the seatback;
      a separated position where the head restraint is separated from the seatback;
      an upright position, such that, when the head restraint is in the extending position, an occupant supporting surface of the head restraint is positioned to support a head of an occupant; and
      a folded position, such that, when the head restraint is in the extending position, the occupant supporting surface of the head restraint is positioned differently than when the head restraint is in the upright position;
   wherein, when the head restraint is in the extending position and the user-accessible manipulable device is not manipulated, the cable of the seatback is not coupled to the cable of the head restraint, and the head restraint can be transitioned from the extending position to the separated position; and
   wherein, when the head restraint is in the extending position and the user-accessible manipulable device is manipulated, the cable of the seatback couples to the cable of the head restraint and thereby causes the head restraint to transition from the upright position to the folded position.

2. The seating assembly of claim 1,
   wherein, the user-accessible manipulable device is a handle.

3. The seating assembly of claim 1,
   the seatback further comprising a post receiver that accepts a post of the head restraint when the head restraint is in the extending position; and
   the cable of the seatback extends into the post receiver and couples with the cable of the head restraint within the post receiver when the head restraint is in the extending position and the user-accessible manipulable device is manipulated.

4. The seating assembly of claim 3,
   the seatback further comprising a gripper disposed within the post receiver and attached to the cable of the seatback;
   the post receiver including an inner wall facing the gripper that forces the gripper to couple to the cable of the head restraint when the head restraint is in the extending position and the user-accessible manipulable device is manipulated.

5. The seating assembly of claim 4,
   the inner wall of the post receiver having a first portion with a first inner diameter, a second portion with a second inner diameter that is larger than the first inner diameter, and a sloped portion transitioning from the first portion to the second portion where an inner diameter of the sloped portion increases from the first inner diameter to the second inner diameter;
   when the user-accessible manipulable device is not being manipulated and the head restraint is in the extending position, the gripper is adjacent to the second portion of the inner wall of the post receiver; and
   as the user-accessible manipulable device is manipulated and the head restraint is in the extending position, the gripper moves from being adjacent to the second portion to contacting the sloped portion and moving toward the first portion and, the inner wall forces the gripper to become coupled to the cable of the head restraint.

6. The seating assembly of claim 5,
   the gripper including a pair of hook shaped portions that clamp against a portion of the cable of the head restraint to become coupled to the cable of the head restraint.

7. The seating assembly of claim 5,
   the gripper including a single hook shaped portion that inserts into a slot of the cable of the head restraint to become coupled to the cable of the head restraint.

8. The seating assembly of claim 1 further comprising:
   a seat having an occupant supporting surface;
   wherein, the seatback further comprises an occupant supporting surface, an upright position where the occupant supporting surface of the seatback is positioned to support the back of an occupant, and a fold down position where the occupant supporting surface of the seatback faces the occupant supporting surface of the seat; and
   wherein, when the user-accessible manipulable device is manipulated, the seatback can transition from the upright position to the fold down position, but when the user-accessible manipulable device is not manipulated, the seatback is secured in the upright position.

9. The seating assembly of claim 8,
   when the head restraint is in the extending position and the upright position, the head restraint prevents a child safety seat from abutting a portion of the occupant supporting surface of the seatback, but while the head restraint is in the separated position and the seatback is in the upright position, the child safety seat is able to abut the portion of the occupant supporting surface of the seatback.

10. The seating assembly of claim 1,
    the head restraint further comprising a post that is accepted by a post receiver of the seatback when the head restraint is in the extending position but is disposed outside of the post receiver when the head restraint is in the separated position; and
    the cable of the head restraint extends into the post of the head restraint and couples with the cable of the seatback to transition the head restraint from the upright position to the folded position when the head restraint is in the extending position.

11. The seating assembly of claim 1,
    the head restraint further comprising a post, through which the cable of the head restraint extends;
    the seatback further comprising a post receiver that accepts the post of the head restraint when the head restraint is in the extending position, and the cable of the seatback extends into the post receiver; and the cable of the head restraint and the cable of the seatback couple when the head restraint is in the extending position and the user-accessible manipulable device is manipulated.

12. The seating assembly of claim 11, the seatback further comprising a gripper attached to the cable of the seatback, and the gripper is disposed within the post receiver; and the post receiver of the seatback including an inner wall facing the gripper that forces the gripper to couple to the cable of the head restraint when the head restraint is in the extending position and the user-accessible manipulable device is manipulated.

13. The seating assembly of claim 12, the inner wall of the post receiver having a first portion with a first inner diameter, a second portion with a second inner diameter that is larger than the first inner diameter, and a sloped portion transitioning from the first portion to the second portion where an inner diameter of the sloped portion increases from the first inner diameter to the second inner diameter;

when the user-accessible manipulable device is not being manipulated and the head restraint is in the extending position, the gripper is adjacent to the second portion of the inner wall of the post receiver; and as the user-accessible manipulable device is manipulated and the head restraint is in the extending position, the gripper moves from being adjacent to the second portion to contacting the sloped portion and moving toward the first portion and, as a consequence, becomes coupled to the cable of the head restraint and causes the head restraint to transition from the upright position to the folded position.

14. The seating assembly of claim 13, the cable of the head restraint terminating in an end with a recess proximate the end; and the gripper including a pair of hook shaped portions that clamp against the recess of the cable of the head restraint to become operably coupled to the head restraint.

15. A seating assembly comprising:

a seatback comprising a user-accessible manipulable device and a cable coupled to the user-accessible manipulable device; and a head restraint comprising a cable connected to a folding mechanism and an extending position extending from the seatback;

wherein, the cable of the head restraint is not coupled to the cable of the seatback when the user-accessible manipulable device is not being manipulated; and wherein, the cable is coupled to the cable of the seatback when the user-accessible manipulable device is being manipulated and thereby causes the folding mechanism to transition the head restraint from an upright position to a folded position.

16. The seating assembly of claim 15, when the user-accessible manipulable device is not manipulated, the head restraint can transition from the extending position to a separated position that is separated from the seatback.

17. The seating assembly of claim 15, manipulation of the user-accessible manipulable device applies a pulling force to the cable of the seatback causing a gripper at an end of the cable to pull the cable of the head restraint thereby causing the folding mechanism to transition the head restraint from an upright position to a folded position.

18. A vehicle comprising:

a user-accessible manipulable device;

a forward seating assembly disposed forward of a rear seating assembly; and the rear seating assembly including a seat having an occupant supporting surface, a seatback having an occupant supporting surface and a cable coupled to the user-accessible manipulable device, a head restraint, an upright position where the occupant supporting surface of the seatback is positioned to support the back of an occupant, and a fold down position where the occupant supporting surface of the seatback faces the occupant supporting surface of the seat;

wherein, the head restraint further comprises:

an extending position where the head restraint extends from the seatback;

a separated position where the head restraint is separated from the seatback;

an upright position when the head restraint is in the extending position, and the seatback is in the upright position, where an occupant supporting surface of the head restraint is positioned to support a head of the occupant;

a folded position, when the head restraint is in the extending position, where the occupant supporting surface of the head restraint is positioned differently than when the head restraint is in the upright position;

a folding mechanism that transitions the head restraint from the upright position to the folded position; and a cable connected to the folding mechanism;

wherein, while the head restraint is in the extending position, the head restraint contacts the forward seating assembly when the head restraint is in the upright position as the seatback transitions from the upright position toward the fold down position, but the head restraint does not contact the forward seating assembly when the head restraint is in the folded position as the seatback transitions from the upright position to the fold down position; and wherein, while the head restraint is in the extending position and the seatback is in the upright position, manipulation of the user-accessible manipulable device couples the cable of the seatback to the cable of the head restraint and causes the folding mechanism to transition the head restraint from the upright position to the folded position.

19. The vehicle of claim 18, when the user-accessible manipulable device is not being manipulated, the head restraint can transition from the extending position to the separated position.

20. The vehicle of claim 18, the user-accessible manipulable device is a handle disposed at the rear seating assembly or a button disposed within the vehicle.

* * * * *